United States Patent [19]
Koksbang et al.

[11] Patent Number: 5,368,959
[45] Date of Patent: Nov. 29, 1994

[54] CURRENT COLLECTORS FOR ELECTROCHEMICAL CELLS AND BATTERIES

[75] Inventors: Rene Koksbang, San Jose, Calif.; Ib I. Olsen, Odense, Denmark

[73] Assignee: Valence Technology, Inc., San Jose, Calif.

[21] Appl. No.: 40,312

[22] Filed: Mar. 30, 1993

[51] Int. Cl.⁵ .................. H01M 4/48; H01M 4/58; H01M 4/66
[52] U.S. Cl. .................. 429/212; 429/192; 429/218
[58] Field of Search .................. 429/192, 191, 212, 218

[56] References Cited

U.S. PATENT DOCUMENTS

| | | |
|---|---|---|
| 4,269,911 | 5/1981 | Fukuoka et al. .................. 429/212 X |
| 4,452,872 | 6/1984 | Klinedinst et al. .............. 429/212 X |
| 4,547,439 | 10/1985 | Genies .................. 429/213 X |
| 4,569,734 | 2/1986 | Naarmann et al. . |
| 4,640,749 | 2/1987 | Naarmann et al. . |
| 4,812,376 | 3/1989 | Rudolph . |
| 4,818,646 | 4/1989 | Takakubo et al. . |
| 4,830,939 | 5/1989 | Lee et al. . |
| 4,925,752 | 5/1990 | Fauteux et al. . |
| 4,987,042 | 1/1991 | Jones et al. . |
| 5,057,387 | 10/1991 | Masuda et al. .................. 429/218 X |

OTHER PUBLICATIONS

M. G. Kanatzidis, "Conductive Polymers", Dec. 3, 1990, C&EN, pp. 36–54.

*Primary Examiner*—John S. Maples
*Attorney, Agent, or Firm*—Linda M. Deschere

[57] ABSTRACT

In an electrochemical lithium cell having a negative electrode, a positive electrode and an electrolyte separator there is provided a positive electrode current collector which comprises a redox active conductive polymer.

12 Claims, 2 Drawing Sheets

POLYANILINE

POLYPYRROLE

POLYTHIOPHENE

POLYPHENYLENE

CURRENT COLLECTORS FOR ELECTROCHEMICAL CELLS AND BATTERIES

FIELD OF THE INVENTION

This invention relates to a current collector for lithium batteries and more specifically to current collectors prepared from conductive polymer films.

BACKGROUND OF THE INVENTION

The cathode current collector of a battery serves several functions. One of the functions is to conduct the flow of electrons between the active material of the electrode and the battery terminals. Cathode current collectors may also provide some support for the cathode active material. Cathode current collector materials must maintain chemical stability and mechanical integrity in corrosive electrolytes throughout cell life. However, this is often a problem, since the availability of materials Capable of meeting such requirements is limited.

Current collectors in use today, consist of either a metal foil or a metal mesh, and the metal is typically nickel, stainless steel or aluminum. These materials contribute significantly to both the weight and volume of the battery. They do not contribute to the energy content since they are inactive materials. Consequently, the use of metal foil current collectors reduces the volumetric and gravimetric energy density of a battery as compared to what the energy density would have been if less dense and more highly conductive materials were available. In addition, under battery operating conditions, corrosion of the cathode metal current collector occurs. Such metal foil current collectors electrochemically dissolve and this is particularly a problem if thin current collectors are used in an attempt to improve energy density values. Corrosion of typical metal current collectors often leads to loss of contact, electronic isolation and, consequently, to poor battery performance.

Therefore, what is needed is a cell construction and method of operation which overcome problems with cathode current collector corrosion and which provide a less expensive, light weight cell having more attractive electronic conductivity properties.

SUMMARY OF THE INVENTION

According to the invention, there is provided an electrochemical cell which has a positive electrode (cathode) current collector which comprises a carbon-based material containing one or more conductive polymers. These polymers are characterized by an ability to conduct electrons by means of single and double bonds alternating along a main polymer chain. Such conductive polymers include: poly-phenylene, polyaniline, polypyrrole and polythiophene.

A typical electrode of an electrochemical cell comprises a body of active material and a current collector. It is preferred that the conductive polymer current collector is in the form of a coating carried on a major surface of the body of active material of the electrode. A typical cell configuration has a lithium containing negative electrode body, a positive electrode body comprising active material and an electrolyte between the bodies. The improved current collector is in electrical contact with the major surface of the positive electrode body distal from the electrolyte. The typical active material body of the positive electrode comprises a transition metal chalcogen compound having a reversible lithium insertion ability. Such positive electrode active material is typically used in combination with a metallic lithium anode.

Accordingly, objects, features and advantages of the present invention are to provide an improved electrochemical battery based on lithium which maintains its integrity over a prolonged life-cycle as compared to presently used batteries; and to provide a current collector which obviates problems associated with conventional metal current collectors.

These and other objects, features and advantages will become apparent from the following description of the preferred embodiments, appended claims and accompanying drawings.

DETAILED DESCRIPTION OF THE PREFERRED EMBODIMENTS

Figure 1:
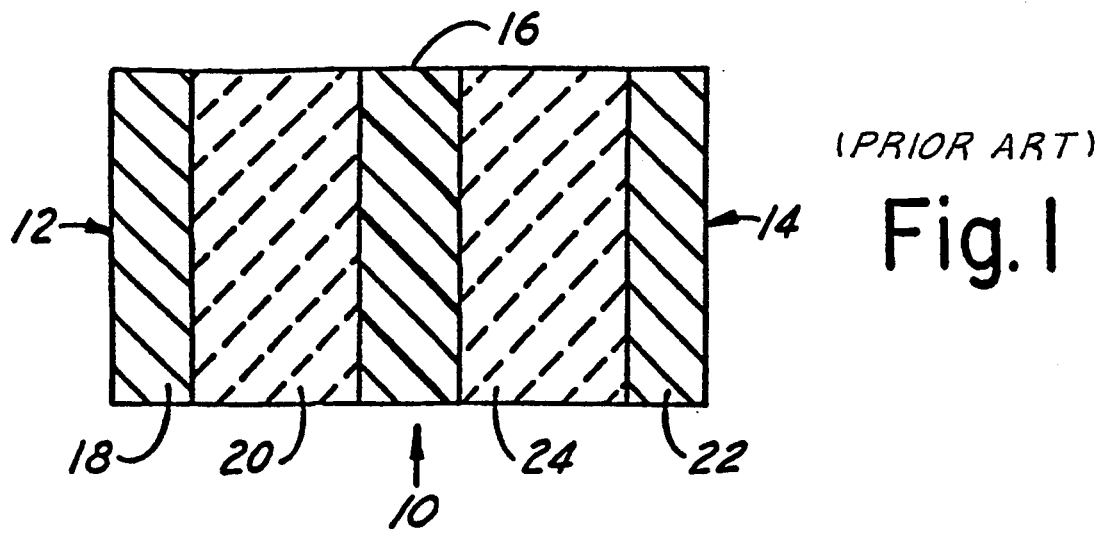
FIG. 1 is an illustration of a cross-section of a conventional (prior art) lithium battery or cell.

As shown in FIG. 1, a conventional (prior art) electrochemical cell or battery 10 has a negative electrode side 12, a positive electrode side 14, and an electrolyte separator 16 therebetween. In accordance with common usage, a battery may consist of one cell or multiple cells. The negative electrode side 12 is the anode during discharge, and the positive electrode side 14 is the cathode during discharge. The negative electrode side 12 includes current collector 18, typically of nickel, iron, aluminum, stainless steel, and/or copper foil, and a body of negative electrode active material 20. The negative electrode active material 20 consists of lithium, or compounds and alloys thereof, and is sometimes simply referred to as the negative electrode. The positive electrode side 14 includes current collector 22, typically of aluminum, nickel, iron, stainless steel, and/or copper, and a body of positive electrode active material 24 which is usually different than the negative electrode active material 20. The positive electrode active material 24 is sometimes simply referred to as the positive electrode. Typical positive electrode active materials include transition metal chalcogen compounds having a reversible lithium insertion ability, wherein the transition metal is at least one selected from the group consisting of Ti, V, Cr, Mn, Fe, Nb, Mo, Ta and W, and the chalcogen is at least one selected from the group consisting of O, S and Se. The separator 16 is typically a solid electrolyte, electrolyte separator. A suitable electrolyte separator is described in U.S. Pat. No. 4,830,939 incorporated herein by reference. The electrolyte separator is a solid, preferably polymeric matrix, containing an ionically conductive liquid with an alkali metal salt, where the liquid is an aprotic polar solvent. The terms "solid electrolyte" and "electrolyte separator" are used interchangeably in industry. Sometimes, the term "separator" is used.

A problem associated with rechargeable lithium batteries is the corrosion of the metal current collector 22 on the cathode. At high potentials reached at the end of charge, namely, 3.0–3.5 V for $V_6O_{13}$-based cathodes and 4.0–4.5 V for Li-Mn-O-based cathodes, even nickel foil is electrochemically dissolved. This limits the useful life of such batteries, especially if very thin current collectors 22 are used.

Figure 2:
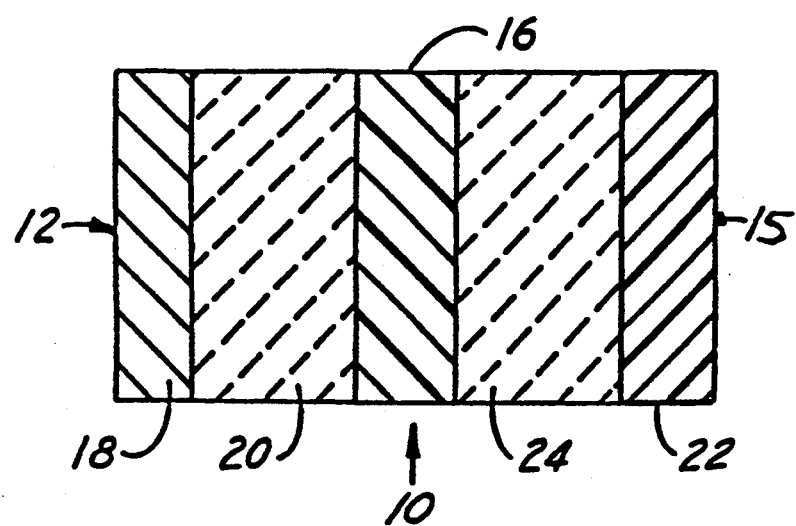
FIG. 2 is an illustration of a cross-section of a lithium battery or cell having a current collector comprising electrically conductive polymer.

Such problems are obviated in accordance with the invention by the use of certain carbon-based materials, namely, redox active conductive polymers such as polypyrrole, polythiophene, polyphenylene and polyaniline. Such conductive polymers are electrochemically stable in oxidation, i.e. at high potentials. As shown in FIG. 2, an electrochemical battery or cell 10 has like parts numbered as in FIG. 1, however, FIG. 2 has a cathode current collector 15 of conductive polymer. Organic redox active conductive polymers include polypyrrole, polythiophene, polyphenylene and polyaniline. These polymers are characterized by electric properties which allow fast transport of electrons across the polymer. Polymer electrodes are formed chemically or electrochemically. Apart from the electrical requirements, the only other requirement is that the current collector be at least a monolayer of molecules. It is preferred that the current collector be at least a few microns in thickness and self-supporting. thickness of 50 microns was used in a test cell with good results.

The electrode current collector is preferably in the form of a sheet or foil formed solely of a conducting polymer. Alternatively, such electrode current collector may be in the form of a composite sheet or foil, that is, a composite foil of a binder and a conducting phase comprising the electrically conductive polymer. In either form, the conducting polymer desirably has a conductivity of $10^{-4}$ Siemens/cm (S/cm) and preferably $10^{-3}$ Siemens/cm or higher. It is preferred that the conductivity of the polymers not limit the rate capabilities of the battery system. That is, the conductivity should probably not be much lower than the conductivity of the composite electrode active material and electrolytes, that is, greater than 0.001 and preferably in the range of 0.001–0.01 S/cm. Electrically conductive polymers are also known to be capable of transporting positive ions such as Li. U.S. Pat. No. 4,640,749, assigned to BASF demonstrates a method for forming a self-supporting sheet of conductive copolymers of pyrroles, and is incorporated herein by reference in its entirety. Those skilled in the art will appreciate that composite polymer (plastic) sheets are able to be shaped into a suitable form to provide an essentially self-supporting current collector sheet. General methods for forming composite polymer (plastic) films include application of a solution to a surface or painting onto a surface, and then mechanical or hot-pressing onto such surface. Typical general methods are as described in U.S. Pat. No. 4,812,376 incorporated herein by reference in its entirety.

The basic properties of redox active conducting polymers useful in the invention are generally described by Mercouri G. Kanatzidis in an article entitled "Conductive Polymers", published in the Dec. 3, 1990 issue of Chemical and Engineering News, pp 36–54. Basic exemplary methods for preparing and applying such conductive polymers are also described in Kanatzidis' article. Properties and methods pertinent to the invention are described below.

Figure 3:
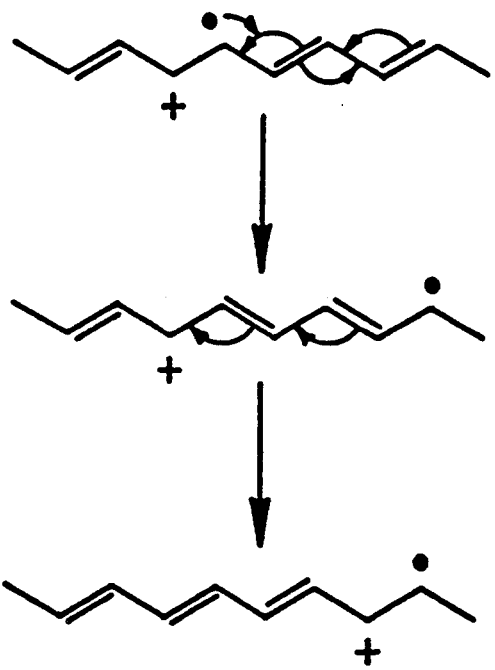
FIG. 3 illustrates movement of cations (+) and electrons (.) along a conductive polymer chain of single and double bonds.

All conductive polymers are characterized by pi-conjugated systems which are single and double bonds alternating along a polymer chain. The alternating single and double bonds give rise to certain unique electrical properties. The movement of an electron and a corresponding positively charged species along the polymer chain is illustrated in FIG. 3. The ability to transport charged species along the polymer chain and the ability to conduct an electron along the polymer chain make such conductive polymers uniquely suited to ionic transport and electronic transport functions. Electron transport is required for the cathode current collector, while at the same time, degradation of the current collector is avoided. It should be noted that the conductivity of the polymers varies widely up to about 10,000 Siemens/cm (S/cm). Doping materials include lithium, halogens and chlorine oxides.

Figure 4:
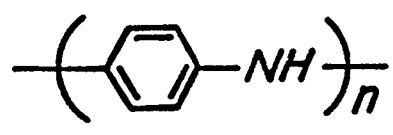
FIGS. 4–7 show the basic unit of conductive polymers of polyaniline (4), polypyrrole (5), polythiophene (6), and polyphenylene (7).

Polyaniline, FIG. 4, consists of about 1,000 or more repeating units. Polyaniline may exist in several oxidation states with electrical conductivity varying from $10^{-11}$ S/cm, to more than 10 S/cm. Polyaniline has a wide range of attractive electrical and electrochemical properties and exhibits good stability.

The electrically conductive form of polyaniline is easily synthesized by electrochemical or chemical oxidation of aniline in aqueous acidic media using common oxidants. Doping is initially accomplished by dipping the films in acid or passing the gaseous acid over them. Doping of polyaniline to produce an electronic conductor should not be confused with protonic conductivity. Proton containing polymers having H+ must be avoided and such polymers can be made with Li+ replacing H+. For conductive polymers, common doping materials include Li, K, Na, B, F and BF.

Figure 5:
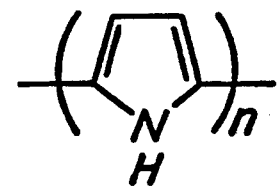
Figure 6:
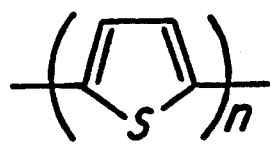

Conductive polymers such as polypyrrole (FIG. 5) and polythiophene (FIG. 6) are formed by chemical and electrochemical methods. The basic procedure includes forming solutions containing pyrrole or thiophene and a lithium salt. A foil may then be coated by slowly passing the foil through the solution and simultaneously applying a voltage or current between a counter-electrode in the solution and the foil, as the working electrode. The conductive polymer layer or sheet is then removed from the foil, followed by lamination of the polymer onto a component of the cell for assembly. Alternatively, other cell components may be laminated onto the conductive polymer with a lithium foil.

U.S. Pat. No. 4,569,734, incorporated herein in its entirety by reference, describes a process for preparing polypyrrole coatings and self-supporting foils. Polypyrroles are prepared by electrochemical polymerization of pyrrole alone or together with comonomers, in an aqueous electrolyte solvent. The process provides polypyrrole films which have good mechanical properties and high electrical conductivities. Such polypyrroles doped with a transition metal are described in U.S. Pat. No. 4,818,646 incorporated herein by reference in its entirety. Such films or foils are conveniently deposited on metal electrode substrates. The deposited film is then removed for assembly in a cell or application to an electrode.

Accordingly, films may be grown on an anode foil when pyrrole is oxidized electrochemically. The same is true for thiophene. It is probably advantageous, though not strictly necessary, to include conductive polymer dopant prior to assembly of the battery. Since both anions and cations are consumed during doping, it is necessary to make up any loss of electrolyte salt (Li+)

if the conductive polymer is doped in situ. A method for forming highly electrical conductive copolymers of pyrroles which possess good mechanical properties is described in U.S. Pat. No. 4,640,749 which is incorporated herein by reference in its entirety. BASF, in Germany, manufactures and markets a pyrrole foil. It is thought to be prepared by the basic process as described in U.S. Pat. Nos. 4,640,749 and 4,569,734, which are assigned to BASF and are incorporated herein by reference in their entirety. As described above, pyrroles are prepared by anodic polymerization in a polar solvent in the presence of a suitable conductive salt.

Similarly U.S. Pat. No. 4,987,042, assigned to BASF describes a method for forming polythiophenes and thiophenes polymerized with other polymerizible compounds to improve mechanical properties of the end product films without adversely affecting electrical properties. U.S. Pat. No. 4,987,042 is incorporated herein by reference in its entirety. Both chemical and electrochemical methods are described for forming such polythiophene polymers and copolymers. In the case of electrochemical methods, an electrolytic cell having a platinum anode and a solution containing an ethylene dioxythiophene is prepared and electrolysis is carried out for 4 hours at room temperature at a relatively constant current and 3.5 volts to form polythiophene deposited on the platinum anode in the form of a coating. Once electrolysis is completed, the coating may be washed and then removed from the platinum anode for subsequent application to an electrode.

Figure 7:
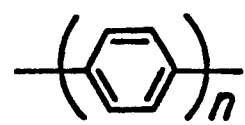

As described in U.S. Pat. No. 4,640,749 issued to BASF, a polypyrrole (FIG. 6) and polyphenylene (FIG. 7) composite film may be formed electrochemically by using polyphenylene as an anode in a pyrrole solution.

FIGS. 4–7 illustrate base monomeric units of aniline, pyrrole, thiophene and phenylene; other functionally equivalent and related compositions are described above and incorporated by reference. The current collector of the invention may be formed from functionally equivalent derivatives of the polymers of FIGS. 4–7 having a conductivity greater than 0.0001 and preferably 0.001 to 0.01 as stated earlier. Conductive polymers and their derivatives include, for example, substituted and unsubstituted cyclic monomeric units, organic substituent groups at a respective carbon atom of the cyclic unit; and cyclic hydrocarbon fused to the cyclic monomeric unit. Examples of such derivatives may be found in the patents incorporated by reference hereinabove.

In use in a cell or battery, electrons are conducted along the main chain of the conductive polymer. As shown in FIG. 4, this is achieved through a conjugated polymer chain by shifting of double bonds.

The conductive polymer current collectors in the form of thin sheets were used in rechargeable batteries, adding to the energy content compared to batteries which use metal foils as current collectors. This is because the volumetric energy density of the battery is increased, because when the current collector volume is kept constant, the polymer adds some capacity to the battery. The influence on the gravimetric energy density is greater because the density of the polymer is typically around 1 to 1.5 grams/cubic centimeter (g/cm$^3$), whereas it is about 8 g/cm$^3$ for nickel and copper foils, and about 2.4 g/cm$^3$ for aluminum. The electronic conductivity of the polymer, sufficient for use in current collectors, is in the range recited above, and particularly 100 to 1,600 ohms $-1$ cm $-1$ in the case of polypyrrole. The value depends on the preparation method used.

Preliminary experiments on a single cell demonstrated that the impedance of a cathode coated onto a 50 micron thick polypyrrole foil was similar to an identical cathode coated onto a 15 micron thick nickel foil current collector. The polymer current collector may be used with both primary and secondary lithium batteries, as well as with both solid and liquid electrolytes.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A battery having a positive electrode comprising a current collector, and a layer comprising an intercalation cathode active material having a reversible lithium insertion ability, said layer having a major surface in electrical contact with the current collector, the improvement comprising: the current collector comprising a conductive polymer having a number of cyclic monomeric units selected from the group consisting of substituted and unsubstituted: aniline, pyrrole, thiophene, phenylene and mixtures thereof.

2. The battery according to claim 1 wherein the monomeric units are unsubstituted.

3. The battery according to claim 1 wherein the monomeric units are substituted.

4. The battery according to claim 1 wherein the conductive polymer is in the form of a thin sheet or foil.

5. The battery according to claim 1 wherein the conductive polymer is in the form of a coating carried on the major surface of the cathode active layer.

6. The battery according to claim 1 wherein the current collector has a thickness of about 50 microns.

7. The battery according to claim 1 wherein the intercalation material is a transition metal chalcogen, the transition metal is at least one selected from the group consisting of Ti, V, Cr, Mn, Fe, Nb, Mo, Ta and W, and the chalcogen is at least one selected from the group consisting of O, S, and Se.

8. A positive electrode comprising a current collector, and a layer comprising an intercalation cathode active material having a reversible lithium insertion ability, said layer having a major surface in electrical contact with the current collector, the improvement comprising: the current collector comprising a conductive polymer having single and double bonds alternating along a main polymer chain and selected from the group consisting of substituted and unsubstituted; polyaniline, polypyrrole, polythiophene, polyphenylene and mixtures thereof.

9. The positive electrode according to claim 8 wherein the current collector has a thickness of about 50 microns.

10. The positive electrode according to claim 8 wherein the intercalation material is a transition metal chalcogen, the transition metal is at least one selected from the group consisting of Ti, V, Cr, Mn, Fe, Nb, Mo, Ta and W, and the chalcogen is at least one selected from the group consisting of O, S, and Se.

11. The battery according to claim 8 wherein the conductive polymer is in the form of a thin sheet or foil.

12. The battery according to claim 8 wherein the conductive polymer is in the form of a coating carried on the major surface of the cathode active layer.

* * * * *